United States Patent [19]

Yoshida et al.

[11] Patent Number: 5,765,065
[45] Date of Patent: *Jun. 9, 1998

[54] SINGLE-USE CAMERA WITH REDUCED WINDING NOISE

[75] Inventors: Koujiro Yoshida; Shuri Mizoguchi; Yaichi Iijima; Masayoshi Era; Ken Ishida; Hiroshi Kibayashi, all of Hino, Japan

[73] Assignee: Konica Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 663,669

[22] Filed: Jun. 14, 1996

[30] Foreign Application Priority Data

Jun. 22, 1995 [JP] Japan ................. 7-156281
Nov. 1, 1995 [JP] Japan ................. 7-285129
Mar. 21, 1996 [JP] Japan ................. 8-064425

[51] Int. Cl.⁶ ...................................................... G03B 1/00
[52] U.S. Cl. ................................................. 396/396; 396/389
[58] Field of Search .............................. 396/411, 395–400, 396/389

[56] References Cited

U.S. PATENT DOCUMENTS 5,510,866 4/1996 Solomon et al. ............... 354/204
5,576,790 11/1996 Lamphron et al. ............. 396/396

Primary Examiner—Howard B. Blankenship
Attorney, Agent, or Firm—Jordan B. Bierman; Bierman, Muserlian and Muserlian

[57] ABSTRACT

A single-use camera which includes: a film winding knob, capable of rotating in the winding direction, for winding a film so as to feed the film frame by frame; a reversion-preventing member, having an engagement with the film winding knob, for preventing the film winding knob from rotating in the opposite direction to the winding direction; a releasing member for releasing the engagement of the reversion-preventing member with the film winding knob when the film is wound by the film winding knob so that the noise, generated from the reversion-preventing member, is prevented.

18 Claims, 17 Drawing Sheets

SINGLE-USE CAMERA WITH REDUCED WINDING NOISE

BACKGROUND OF THE INVENTION

The present invention relates to a camera in which a film is wound up when a film-winding knob is rotated and to a single-use camera unit, and in particular, to a mechanism for reducing a noise that is produced in the course of film winding, which is especially suitable for a simple camera or a single-use camera unit.

In the case of a conventional simple camera and a single-use camera unit which are of a manual film winding type employing a film winding knob, there has been employed the so-called ratchet mechanism wherein an outer circumference of a film winding knob which is rotated to wind up a film is formed to be serrated, and a leaf spring made of resin or metal is engaged with teeth of the serration so that the film winding knob may rotate only in one direction of film winding. Owing to such constitution, it has been possible to prevent that a film wound around a film winding shaft engaged with the film winding knob is unwound due to its tension, which results in prevention of displacement of a photographed image area, and thereby to prevent occurrence of a serious problem that adjoining photographed image areas are superposed.

However, in the film winding mechanism of a conventional simple camera and a single-use camera unit which are of a manual film winding type employing a film winding knob, the ratchet mechanism mentioned above causes vibrational noises each time the leaf spring passes through the peak of each tooth in the serration in the course of film winding, which sounds offensive to the ear. In the place where quietness is required, therefore, people have hesitated to use a camera and a single-use camera unit having the constitution mentioned above.

SUMMARY OF THE INVENTION

In view of the problem mentioned above, an object of the invention is to propose a camera wherein the aforesaid vibrational noise is prevented by a simple mechanism in the course of film winding, or a camera that is especially optimum as an inexpensive simple camera and a single-use camera unit.

In a camera wherein a film is wound up when a film winding knob is rotated, and a reversion-preventing claw which prevents inverse rotation of the film winding knob is engaged with the film winding knob, the aforesaid object is attained by the following;

(1) there is provided a releasing member that has an arm portion engaged with the reversion-preventing claw, rotates integrally with the film winding knob through sliding fit to the film winding knob with prescribed friction force, makes the reversion-preventing claw to retract with the arm portion in the course of rotation of the film winding knob, and thereby releases engagement with the film winding knob, (2) there is provided a releasing member that has an arm portion engaged with the reversion-preventing claw, makes the reversion-preventing claw to retract with the arm portion by rotating with a finger of a photographer in the course of rotation of the film winding knob, and thereby releases engagement with the film winding knob, (3) there is provided a releasing member that makes the reversion-preventing claw to retract with the other end by pressing one end with a finger of a photographer in the course of rotation of the film winding knob, and thereby releases engagement with the film winding knob, (4) there is provided a cam member having a cam that rotates being interlocked with film winding and engages with the reversion-preventing claw, and the cam member is rotated by film winding caused by rotation of the film winding knob so that the reversion-preventing claw may be retracted by the cam, and thereby the engagement with the film winding knob is released, (5) there are provided a camera main body that engages with the film winding knob while having a clearance that makes the film winding knob to retract from the reversion-preventing claw by pressing the film winding knob with a finger of a photographer in the course of rotation of the film winding knob, and an urging member urged to return the film winding knob against pressing of the film winding knob, or (6) there is provided on the reversion-preventing claw a touching portion which comes in contact with a finger of a photographer in the course of rotation of the film winding knob.

Further, in a camera wherein a film is wound up when a film winding knob is rotated, the aforesaid object is attained by the following;

(7) one way clutch that rotates the film winding knob in the only direction of film winding against a camera main body engaging with the film winding knob is engaged with the film winding knob, (8) there are provided a circular elastic member formed integrally with the film winding knob to be coaxial thereto and a reversion-preventing claw which presses with its tip making an acute angle the elastic member, and a supporting portion for the reversion-preventing claw is arranged at the upstream side in the winding direction of the film winding knob from the straight line connecting the rotational center of the elastic member and the tip portion of the reversion-preventing claw and extended, (9) there is formed a V-shaped space diminishing in terms of width in the direction of inverse rotation of the film winding knob, the space being composed of a side of the film winding knob and a wall portion of a camera main body or of a member affixed on the camera main body, and a wedge-shaped reversion-preventing member which presses the side of the film winding knob and the wall portion is arranged in the aforesaid space,

(10) a plurality of saw teeth are formed on the surface excluding an outer circumferential surface with which a finger of a photographer comes in contact on the film winding knob, and plural reversion-preventing claws each preventing reversion of the film winding knob with its one end fixed and other end engaged with the saw tooth are arranged on a camera main body or on a member fixed on the camera main body,

(11) a plurality of saw teeth are formed on a camera main body or on a member fixed on the camera main body facing the prescribed surface excluding an outer circumferential surface with which a finger of a photographer comes in contact on the film winding knob, and plural reversion-preventing claws each preventing reversion of the film winding knob with its one end fixed and other end engaged with the saw tooth are arranged on a prescribed surface of the film winding knob, or

(12) a camera wherein a reversion-preventing means that engages with the film winding knob and prevents the rotation opposite to the winding direction of the film winding knob and a releasing member that separates the reversion-preventing means from the film winding knob are arranged.

A single-use camera unit in which a film is wound up when the aforesaid film winding knob is rotated in the film winding up direction, wherein when the film winding knob is rotated in the direction of film winding, the maximum value of a level of the film winding noise at the point being away from the front side of the single-use camera by 15 cm is 60 dB or less.

DETAILED DESCRIPTION OF THE INVENTION

An example wherein the invention is applied to a single-use camera unit will be explained as follows.

Incidentally, in the category of a camera of the invention, there are included all kinds of cameras employing a film winding knob and an ordinary camera wherein a film can be replaced, but a single-use camera unit is most suitable.

Figure 1:
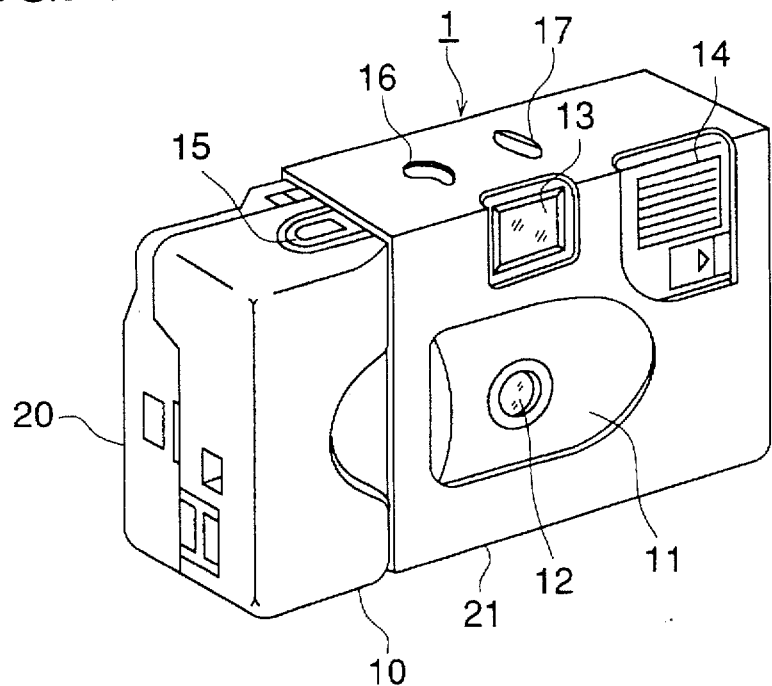
FIG. 1 is a perspective view of a single-use camera viewed from its front side.
Figure 2:
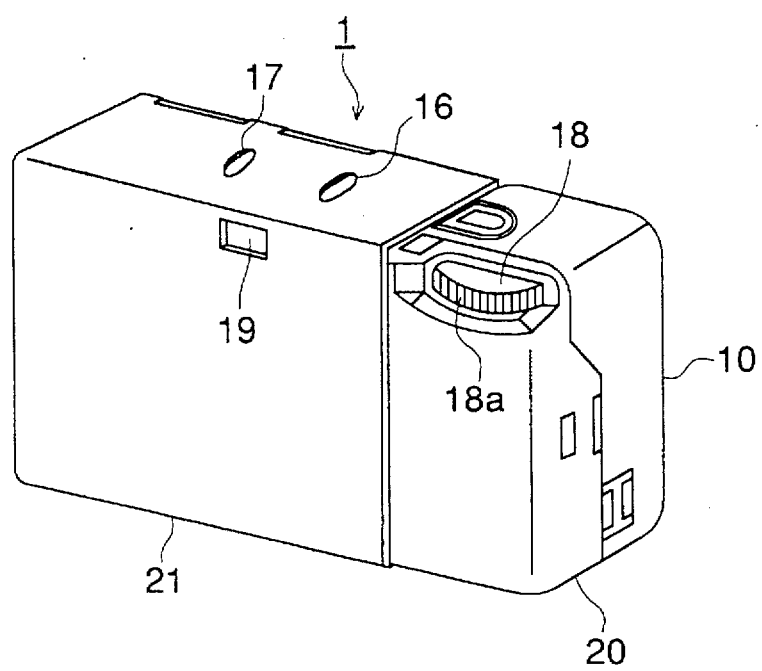
FIG. 2 is a perspective view of a single-use camera viewed from its rear side.

First, a single-use camera unit of the invention will be explained as follows, referring to FIGS. 1 and 2. FIG. 1 is a perspective view wherein a single-use camera is viewed from its front side, while FIG. 2 is a perspective view wherein the single-use camera unit is viewed from its rear side.

Single-use camera 1 is composed of a resin-molded front cover, a main body, a back lid and others, and a camera lens, a shutter, a film winding mechanism, a strobe unit and others are mounted on the main body. Before a single-use camera is shipped, a film cartridge containing therein an unexposed film is loaded in the camera and then the film is wound up in a spool chamber.

In FIG. 1, on the front side of single-use camera unit 1, there are provided front cover 10, camera lens 12 incorporated in lens mount 11, range-finder objective window 13 and strobe flashing section 14, and on the top side thereof, there are provided shutter release button 15, film counter window 16 and strobe charge lamp window 17. In FIG. 2, on the rear side of the single-use camera unit 1, there are provided film winding knob 18, range-finder eye piece window 19 and back lid 20.

Further, the single-use camera unit 1 is covered with paper cover 21. The paper cover 21 is one made by folding and gluing a thick paper. Through the through-holes made on the paper cover, there are exposed lens mount 11, range-finder objective window 13, strobe flashing section 14, film counter window 16, strobe charge lamp window 17 and range-finder eye piece window 19. On the rear side of the paper cover 21, there is described a brief operation manual for the single-use camera unit 1 which is not illustrated.

When winding up a film, single-use camera unit 1 shown in FIG. 2 is held from its rear side by a right hand, and film winding knob 18 is rotated counterclockwise when viewed from the top by a thumb of the right hand while a palm of the thumb keeps pressing serration 18a formed on the side of the film winding knob 18.

A conventional mechanism preventing the reversion of the film winding knob 18 will be explained as follows, referring to FIG. 3. FIG. 3(A) is a top view and FIG. 3(B) is a longitudinal section. As stated above, film winding knob 18 is rotated counterclockwise in the arrowed direction B by a thumb of the right hand while it keeps pressing serration 18a formed on the side of the film winding knob 18 in the arrowed direction A. The serration 18a sticks to a palm of the thumb without slipping thereon for rotation of the film winding knob. On the other hand, beneath the film winding knob 18, there is provided engagement section 18b, and when the film winding knob 18 rotates, a film is wound around an unillustrated film winding shaft in the film cartridge P. Further, for preventing that a film is rewound by its tension, reversion-preventing claw 25 composed of a leaf spring made of resin or metal is engaged with serration 18a of the film winding knob 18. Incidentally, when a main body of a single-use camera unit is made of resin, the reversion-preventing claw 25 can be formed to be united integrally with the main body. Therefore, even when trying to rotate the film winding knob 18 reversely and clockwise, the reversion-preventing claw 25 blocks it and does not allow the inverse rotation.

However, in such conventional mechanism, in the case of winding up a film by rotating the film winding knob 18, vibrational noise is generated when the tip of the reversion-preventing claw 25 passes the peak of a tooth from its valley in serration 18a, to be offensive to the ear.

An embodiment wherein the vibrational noise is eliminated will be shown below.

First Embodiment

Figure 4:
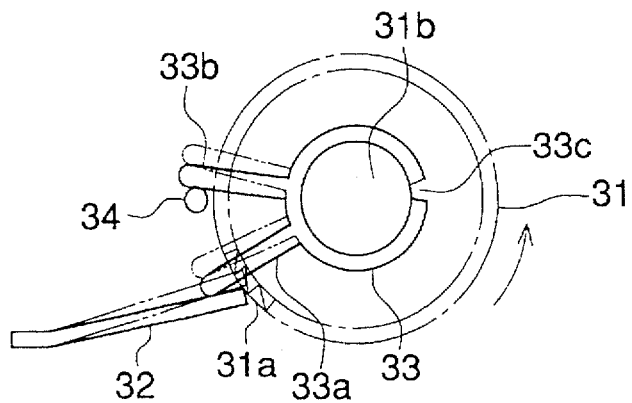
FIGS. 4(A) and 4(B) is a diagram of a film winding knob or the like in its operation of film winding in the first embodiment of the invention.
Figure 4:
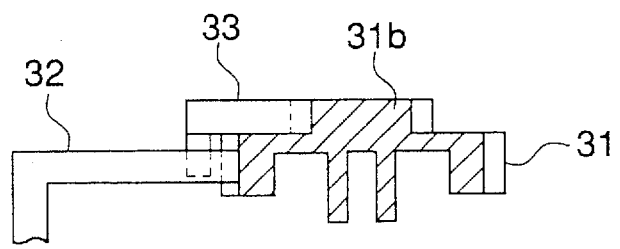
Figure 5:
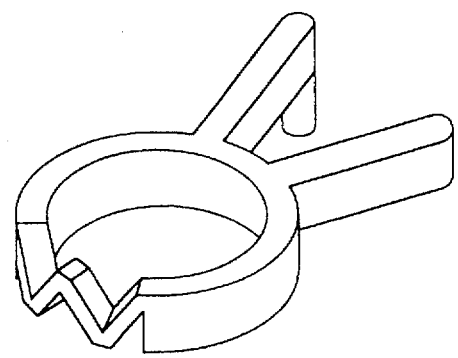
FIG. 5 represents another embodiment of a releasing member in the first embodiment of the invention.

FIGS. 4 and 5 show the first embodiment. FIG. 4 includes diagrams of a film winding knob and others in the course of film winding, and FIG. 4(A) is a top view, FIG. 4(B) is a longitudinal section, and FIG. 5 represents another example of a releasing member.

Figure 3:
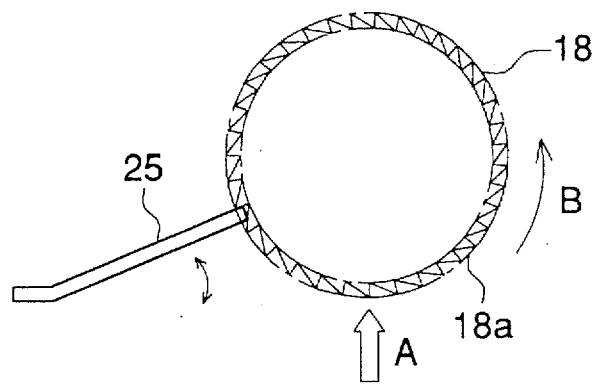
FIGS. 3(A) and 3(B) is a diagram of a conventional structure for preventing reversion of a film winding knob.
Figure 3:
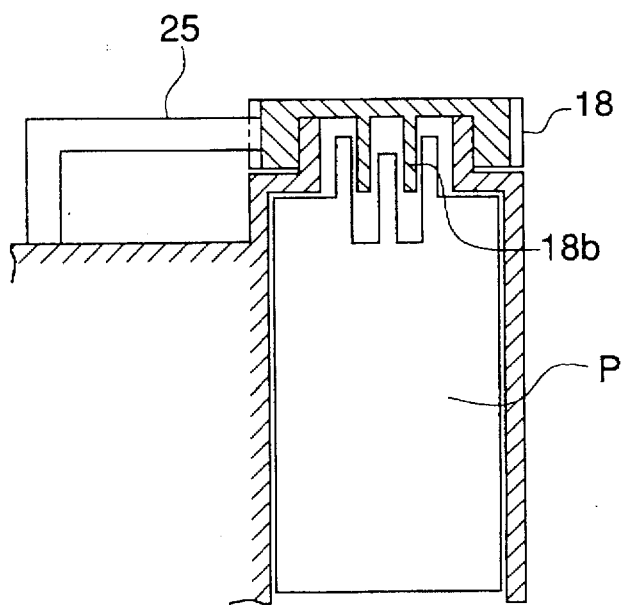

Before film winding, film winding knob 31 and reversion-preventing claw 32 are engaged with each other as shown in FIG. 3 to 4A. Next, when the film winding knob 31 is rotated in the arrowed direction that is a counterclockwise direction, releasing member 33 engaged in a slidable manner with upper shaft 31b of the film winding knob 31 under a prescribed friction force also rotates in the same direction. Thereupon, the tip of arm portion 33a provided on the releasing member 33 deforms the reversion-preventing claw 32 clockwise, and when the reversion-preventing claw 32 is retracted, its engagement with serration 31a formed on the side of the film winding knob 31 is released. Therefore, no vibrational noise is generated by the reversion-preventing claw 32 in the course of film winding.

Incidentally, second arm portion 33b is provided on the releasing member 33, and after the arm portion 33a retracts the reversion-preventing claw 32, the arm portion 32b comes in contact with stopper pin 34 provided on a camera main body, and thus, the releasing member 33 stops after rotating within a predetermined range. Therefore, it is not needed to press unnecessarily the reversion-preventing claw 32 to cause permanent set.

Accordingly, in the initial stage of film winding, the releasing member 33 also rotates when the film winding knob 31 is rotated. However, after the releasing member 33 is stopped with its rotation blocked by both the arm portion 33b and stopper pin 34, the film winding knob 31 only is rotated.

Incidentally, the stopper pin can also be provided on the back side of the reversion-preventing claw 32.

When the film winding knob 31 is rotated by a predetermined angle and thereby film winding for one frame is completed, a finger is released from the film winding knob 31. Therefore, the film winding knob is free from rotational force. Accordingly, the reaction force of the reversion-preventing claw 32 makes the releasing member 33 and the film winding knob 31 to rotate slightly in the reverse direction, and the tip of the reversion-preventing claw 32 engages with serration 31a of the film winding knob 31. Therefore, the film winding knob 31 does not rotate further in the reverse direction.

Further, the releasing member 33 mentioned above has thereon cut-out portion 33c and is formed to be slightly smaller than shaft 31b in terms of an inner diameter. Then, it is force-fit on shaft 31b to be slidable with a prescribed friction force. However, it is also possible to employ a folded shape as shown in FIG. 5 to generate a prescribed friction force, in place of the cut-out portion.

Incidentally, in the embodiment mentioned above, the film winding knob 31 and the releasing member 33 are engaged in a sliding manner through friction on a shaft. However, they may also be engaged in a sliding manner through friction on an end surface of the releasing member 33, in place of friction on s shaft.

Though the rotation of releasing member 33 is blocked by both arm portion 33b and stopper pin 34, it is further possible to provide a stopper pin with which the arm portion 33a comes directly in contact and thereby to block the rotation, without providing arm portion 33b.

Second Embodiment

Figure 6:
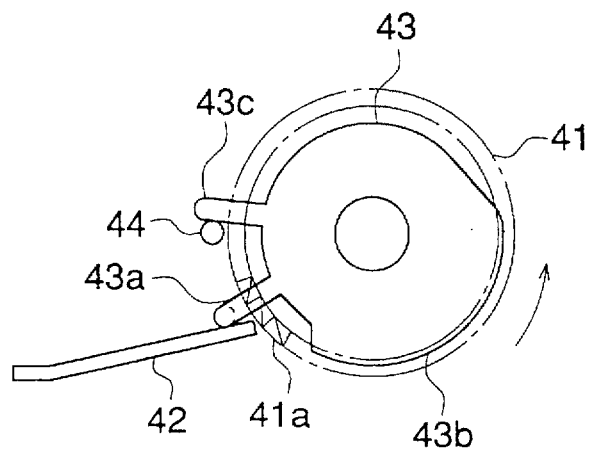
FIG. 6 is a top view of a film winding knob or the like in its operation of film winding in the second embodiment of the invention.

FIG. 6 shows the second embodiment of the invention. FIG. 6 is a top view of a film winding knob and others in the course of film winding operation.

The relation between film winding knob 41 and reversion-preventing claw 42 in the present embodiment is the same as that in the first embodiment. It is also similar to the first embodiment that releasing member 43 having thereon arm portion 43a is engaged with film winding knob 41 in a sliding manner. However, in the present embodiment, the releasing member 43 is rotated by a photographer, which is different from the first embodiment wherein the releasing member 33 is rotated by friction force. Namely, in the case of film winding, a photographer rotates a film winding knob in the arranged direction with his finger, and concurrently with this, operation section 43b of the releasing member 43 is also rotated by a finger, so that arm portion 43a of the releasing member 43 retracts the reversion-preventing claw 42 whose engagement with serration 41a of film winding knob 41 is thus released. Therefore, reversion-preventing claw 42 does not generate vibrational noise in the course of film winding. Incidentally, since operation portion 43b of the releasing member 43 is provided to be adjacent to serration 41a of film winding knob 41 in the thickness direction, a palm of a finger comes unconsciously in pressure contact with both serration 41a and operation portion 43b simultaneously.

Incidentally, since the releasing member 43 is rotated manually in the present embodiment, a controlling member that controls the releasing member 43 within a prescribed range is needed in particular, and the second arm portion 43c provided on the releasing member 43 is caused to come in contact with stopper pin 44.

Though a finger is moved in the direction to rotate both film winding knob 41 in the course of film winding and releasing member 43, the releasing member 43 does not rotate more than a predetermined angle due to the stopper pin 44. Therefore, the releasing member 43 slides on a palm of the finger.

When the film winding knob 41 is further rotated to cover a prescribed angle to complete film winding, the finger is released from both the film winding knob 41 and operation portion 43b of the releasing member 43 is rotated clockwise by the reaction force of reverse-preventing claw 42. However, if the relation between the film winding knob 41 and releasing member 43 is not in the friction-sliding fit as in the first embodiment but is not in the fit of mutual sliding surfaces, the film winding knob 41 does not rotate reversely. Accordingly, the tip of reversion-preventing claw 42 engages with serration 43c again, and reverse rotation of the film winding knob 41 can be prevented.

Though the rotation of the releasing member 43 is controlled by the arm portion 43c and stopper pin 44 in the foregoing, it is also possible to provide a stopper pin with which the arm portion 43a comes in contact directly to control the rotation, without providing the arm portion 43c.

When a film winding knob was rotated for film winding in the present embodiment, noise was hardly heard, and only noise heard was mechanical noise generated at an end of film winding after its completion for one frame.

The maximum value of a level of noise generated by rotation of a film winding knob before the moment when the mechanical noise is generated at the end of film winding was actually measured by an ordinary noise measuring instrument of an integral type NL-02A (made by RION Corp.) with its detecting section positioned to be away from the front face of a single-use camera by 15 cm in the direction perpendicular to the surface of the front side of the camera, repeating 5 times for each of high speed film winding, medium speed rotation film winding and low speed rotation film winding, which are considered in an ordinary use. The results of the measurement were 49 dB–52 dB.

The same measurement as in the foregoing was conducted for a single-use camera available now on the market. The results were 65 dB–73 dB higher than those in the present embodiment.

Film winding noise which depends naturally on its quality is felt to be quiet regardless of its quality if the maximum value of the noise level is 60 dB or less. When it is 55 dB or less, the film winding noise is hardly heard, which is preferable.

Third Embodiment

Figure 7:
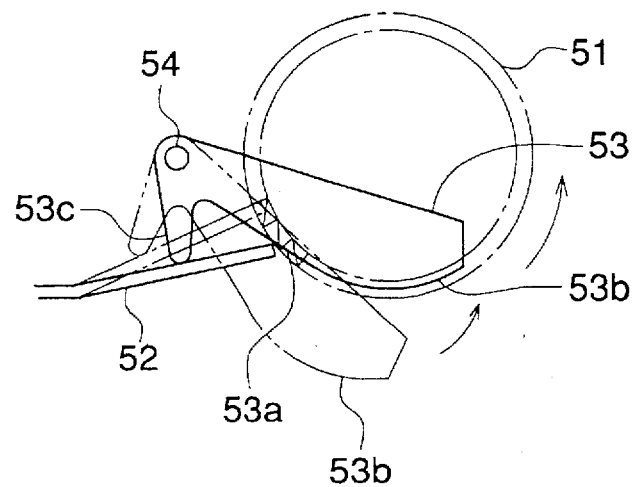
FIG. 7 is a top view of a film winding knob or the like in its operation of film winding in the third embodiment of the invention.

FIG. 7 shows the third embodiment. FIG. 7 is a top view of a film winding knob and others in the course of film winding.

The relation between film winding knob 51 and reversion-preventing claw 52 in the present embodiment explained earlier. However, in the present embodiment, releasing member 53 rotates around the center of shaft 54. Namely, before film winding, operation portion 53b of the releasing member 53 is protruded from film winding knob 51, and releasing portion 53c is retracted from reversion-preventing claw 52 so that the tip of the reversion-preventing claw 52 is engaged with serration 51a. Since the operation portion 53b is provided to be adjacent to serration 51a in its thickness direction, when the serration 51a is rotated by a finger for film winding, the operation portion 53b is pressed and releasing member 53 is rotated counterclockwise. Thereupon, the releasing portion 53c pushes the reversion-preventing claw 52 out to retract it, and thereby release engagement of the reversion-preventing claw 52 and film winding knob 51. Accordingly, film winding is carried out while the operation portion 53b keeps being pushed, and therefore the reversion-preventing claw 52 does not generate vibrational noise in the course of film winding.

When a finger is released from the operation portion 53b after completion of film winding, the releasing member 53 is rotated clockwise by the reaction force of the reversion-preventing claw 52, and the tip of the reversion-preventing claw 52 engages with serration 51a again, thus, reverse rotation of the film winding knob 51 can be prevented.

Fourth Embodiment

Figure 8:
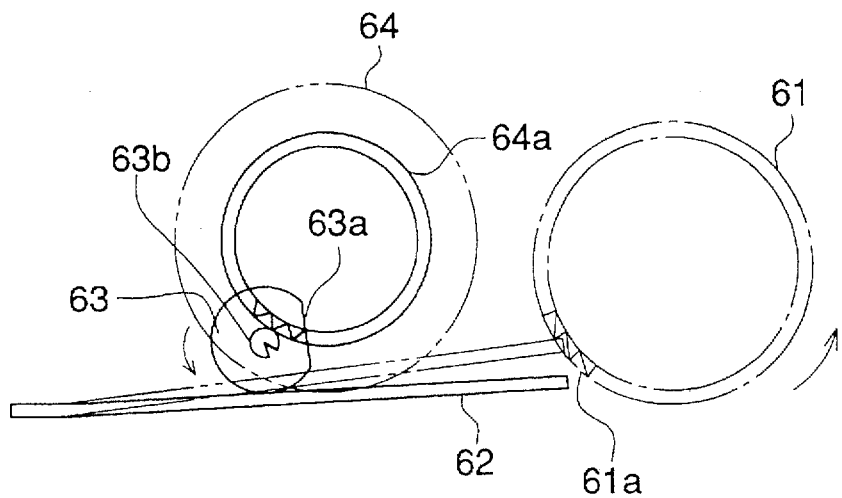
FIG. 8 is a top view of a film winding knob or the like in its operation of film winding in the fourth embodiment of the invention.

FIG. 8 shows the fourth embodiment. FIG. 8 is a top view of a film winding knob and others in the course of film winding.

The relation between film winding knob 61 and reversion-preventing claw 62 in this embodiment is the same as that in the embodiment explained earlier. In this embodiment, however, engagement of the reversion-preventing claw 62 and the film winding knob 61 is released by film feeding. Namely, when the film winding knob 61 is rotated, a film is wound and fed, and this film feeding causes an unillustrated sprocket having 8 teeth to make one turn which corresponds to one frame, and concurrently with this, cam member 63 structured to be united integrally with the sprocket makes one turn. Since the cam member 63 is provided with cam 63a, the reversion-preventing claw 62 is pressed clockwise by the rotation of the cam 63a to be retracted and disengaged from the serration 61a. Accordingly, film winding is carried out while the reversion-preventing claw 62 is retracted, and therefore the reversion-preventing claw 62 does not generate vibrational noise in the course of film winding.

Since the cam member 63 is structured to make one turn for each film winding for one frame, cam 63a of the cam member 63 comes in a position not to press the reversion-preventing claw 62 after completion of film winding, and the tip of the reversion-preventing claw 62 engages with serration 61a again, thus, reverse rotation of the film winding knob 61 can be prevented.

Incidentally, the cam member 63 is provided with film counter drive shaft 63b which rotates film counter gear 64a of film counter 64 to increment by one frame. It is further possible to provide another cam on the cam member 63 so that shutter charge and others may be conducted.

Fifth Embodiment

Figure 9:
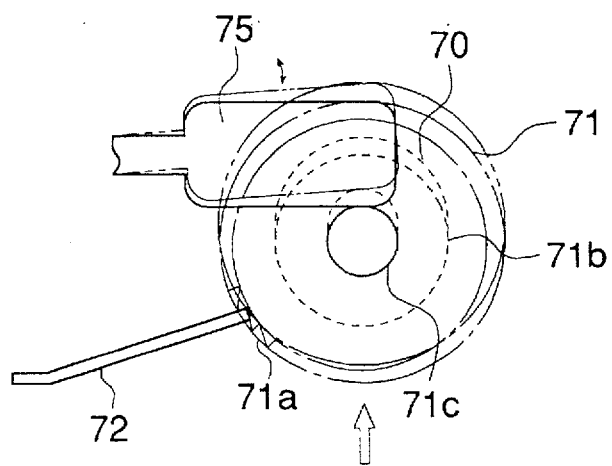
FIG. 9 is a top view of a film winding knob before its operation of film winding in the fifth embodiment of the invention.
Figure 10:
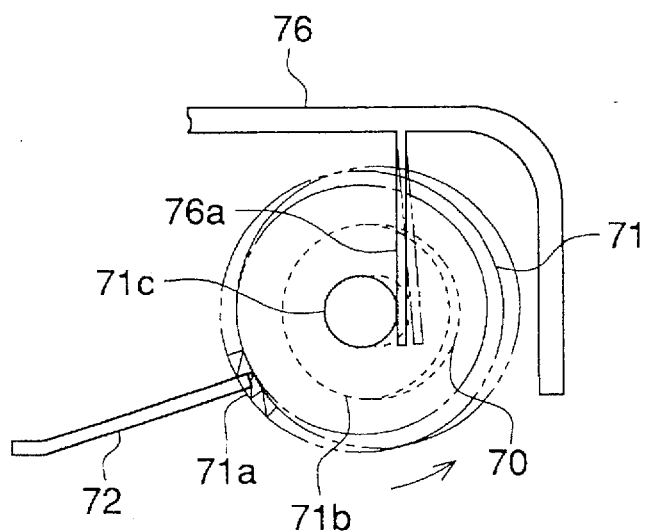
FIG. 10 is a top view of a film winding knob before its operation of film winding in the fifth embodiment of the invention.

FIGS. 9 and 10 represent the fifth embodiment. FIGS. 9 and 10 represent a top view of a film winding knob and others before film winding.

The relation between film winding knob 71 and reversion-preventing claw 72 in this embodiment is the same as that in the previous embodiment. In this embodiment, however, the film winding knob 71 is pressed in the course of film winding to be retracted from the reversion-preventing claw 72.

FIG. 9 is a diagram wherein a clearance is provided by making elongated hole 70 on a camera main body with which engaging shaft 71b of the film winding knob 71 engages, so that the film winding knob 71 can be moved in the direction of rotational center and can be retracted from reversion-preventing claw 72. Further, projection 71c provided at the center of the film winding knob is brought into contact with a side of release button 75 formed elastically, so that the film winding knob 71 may be returned to its original position by the clockwise reaction force of the release button 75 when the pressure on the film winding knob 71 is removed by releasing a hand from it.

Incidentally, though this release button 75 is structured to be able to move both in the direction perpendicular to the sheet surface and in the arrowed direction, it is also possible to use an exclusive urging member composed of an ordinary leaf spring or the like to return the film winding knob 71 to its original position, without using the release button 75.

FIG. 10 is a diagram wherein a clearance is provided by making elongated hole 70 on a camera main body with which engaging shaft 71b of the film winding knob 71 engages, so that the film winding knob 71 can be moved toward the right side in the drawing by the force in the rotational direction and can be retracted from the reversion-preventing claw 72. Similarly to the foregoing, further, projection 71c provided at the center of the film winding knob is brought into contact with elastic portion 76a which is a part of front cover 76 formed to be elastic, so that the film winding knob 71 may be returned to its original position by the reaction force of the elastic portion 76a when the rotation of the film winding knob 71 is stopped by releasing a hand from it.

Incidentally, the elastic portion 76a does not necessarily need to be a part of the front cover 76, and it is also possible to use an exclusive urging member composed of an ordinary leaf spring or the like to return the film winding knob 71 to its original position.

As stated above, in the present embodiment, a film winding knob is moved and is retracted from the reversion-preventing claw 72 in the case of film winding in both cases of FIG. 9 and FIG. 10. Therefore, the reversion-preventing claw 72 does not generate vibrational noise in the course of film winding.

Sixth Embodiment

Figure 11:
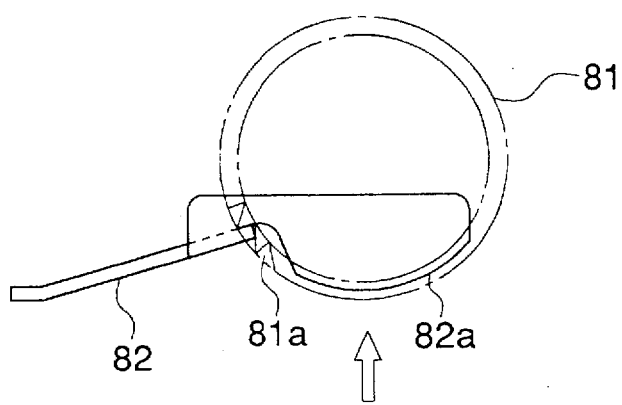
FIG. 11 is a top view of a film winding knob and a reversion-preventing claw in the sixth embodiment.

FIG. 11 shows the sixth embodiment. FIG. 11 is a top view of a film winding knob and a reversion-preventing claw, and there is not a big difference between the state before film winding and that in the course of film winding.

The relation between film winding knob 81 and reversion-preventing claw 82 in this embodiment is the same as that in the previous embodiment explained. However, the reversion-preventing claw 82 of this embodiment is provided with operation portion 82a, and therefore, both the film winding knob 81 and the operation portion 82a are brought into contact with a finger of a photographer in the course of film winding. Therefore, even when vibration is generated when the reversion-preventing claw 82 passes the peak from the valley in serration 81a, the vibration is absorbed in the finger of a photographer through the operation portion 82a. The vibrational noise, if generated, is much smaller than ordinary one, and it is not offensive to the ear.

Incidentally, it is also possible that the reversion-preventing claw 82 is made of resin and it is formed to be united integrally with a main body.

Seventh Embodiment

FIGS. 12–15 represent the seventh embodiment. In this embodiment, a film winding knob is engaged with a one-way clutch which rotates the film winding knob only in the film winding direction on a stepless basis, without employing a reversion-preventing claw, so that reverse rotation of the film winding knob can be prevented. Accordingly, conventional vibrational noise caused by a reversion-preventing claw is not generated in the course of film winding.

Figure 12:
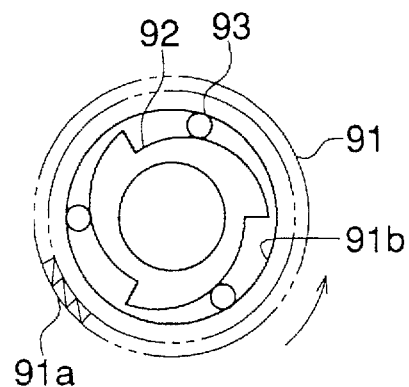
FIG. 12 is a top and sectional view of a wedge clutch in the seventh embodiment.
Figure 13:
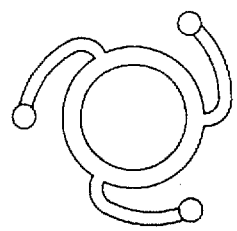
FIG. 13 is a top view of an example of a friction member in the seventh embodiment.
Figure 14:
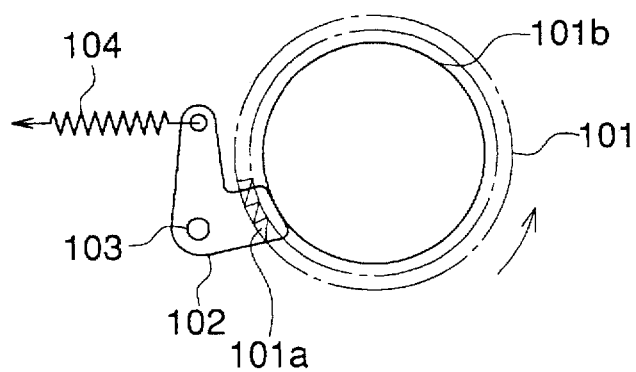
FIG. 14 is a top view relating to a cam clutch in the 7th embodiment.
Figure 15:
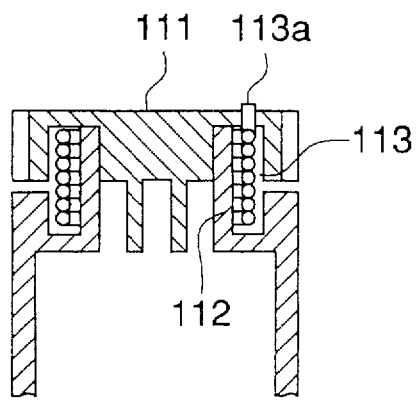
FIG. 15 is a longitudinal section relating to a spring clutch in the 7th embodiment.

FIG. 12 is a plan sectional view relating to a wedge clutch that is one of one-way clutches, FIG. 13 is a plan view of an example of a friction member, FIG. 14 is a plan view relating to a cam clutch, and FIG. 15 is a longitudinal section relating to a spring clutch.

First, a wedge clutch will be explained, referring to FIG. 12. On film winding knob 91, there is provided hole 91b that is concentric with serration 91a, and on the center of the hole 91b, there is provided cam-shaped camera main body 92 as shown in the drawing, and balls 93 are arranged in the clearance between camera main body 92 and the hole 91b as a friction member. When the film winding knob 91 is rotated in the arrowed direction which is a counterclockwise direction, balls 93 are also rotated in the same direction due to frictional force of the inner circumferential surface of hole 91b, and are moved to the broader portion in the clearance between main body 92 and hole 91b, so that the balls 93 are not controlled. Therefore, the film winding knob 91 can rotate freely in the arrowed direction.

On the other hand, when the film winding knob 91 is rotated clockwise, balls 93 are also rotated in the same direction by frictional force on the inner circumferential surface, and are moved to and fixed at the so-called wedge-shaped portion where the clearance between the main body 92 and hole 91b is narrower, resulting in inability of the film winding knob 91 to rotate.

Therefore, the film winding knob 91 is capable of rotating only in the film winding direction and is not capable of rotating reversely. Therefore, the same effect as that of a conventional reversion-preventing claw is offered, and yet, disagreeable noise such as that caused by a reversion-preventing claw is not generated.

Incidentally, cylindrical rolls may also be used as a frictional member in place of balls, or three spherical or cylindrical frictional members made of resin and formed to be united as shown in FIG. 13 may be used.

Further, an inner circumferential surface of the film winding knob 91 may be formed to be cam-shaped, and camera main body 92 may be made to be a concentric shaft, which is opposite to the foregoing.

Next, a cam clutch will be explained as follows, referring to FIG. 14. Film winding knob 101 has a step formed by outside diameter 101b smaller than serration 101a, and cam plate 102 is supported rotatably around shaft 103 so that the tip of the cam plate 102 may be brought into pressure contact with the outside diameter 101b by urging member 104. Due to the constitution mentioned above, when trying to rotate the film winding knob 101 counterclockwise, namely, in the arrowed direction, it can be rotated with the outside diameter 101b of the cam plate 102 left being in pressure contact by urging force of urging member 104. However, when trying to rotate the film winding knob 101 clockwise, the tip of the cam plate 102 is deadlocked by the outside diameter 101b, thus the film winding knob 101 can not be rotated.

Lastly, a spring clutch will be explained, referring to FIG. 15. Between film winding knob 111 and camera main body 112, there is arranged coil spring 113. The coil spring 113 is wound around the camera main body 112 on a left-handed basis with its one end 113a fixed on the film winding knob 111. Accordingly, when winding up a film by means of the film winding knob 111, nothing is controlled by the coil spring 113 and a film can be wound up because the coil spring 113 is supposed to be loosened against camera main body 112. However, when trying to rotate the film winding knob 111 reversely, it can not be rotated because the coil spring 113 is tightened against the camera main body 112.

Eighth Embodiment

Figure 16:
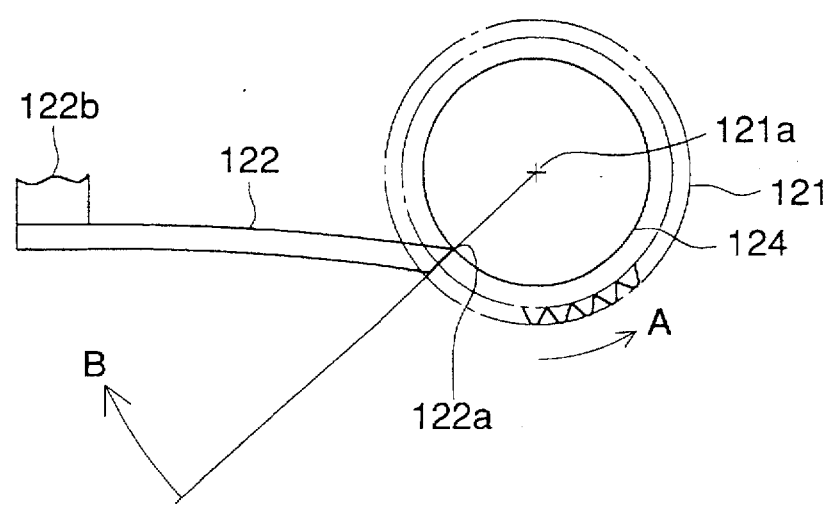
FIG. 16 is a top view of a film winding knob and others in the course of film winding in the eighth embodiment.
Figure 17:
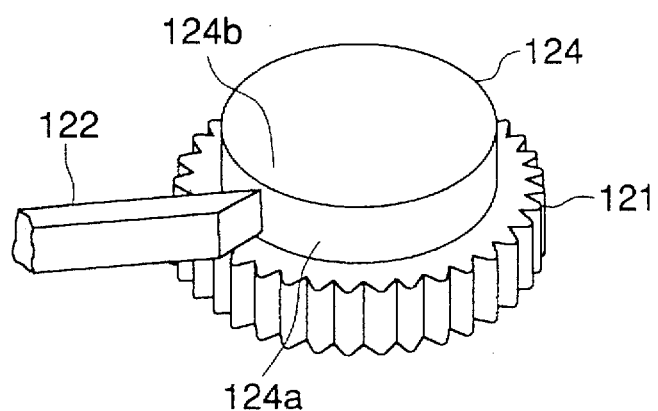
FIG. 17 is a perspective view wherein the 8th embodiment is viewed from the upper part.
Figure 18:
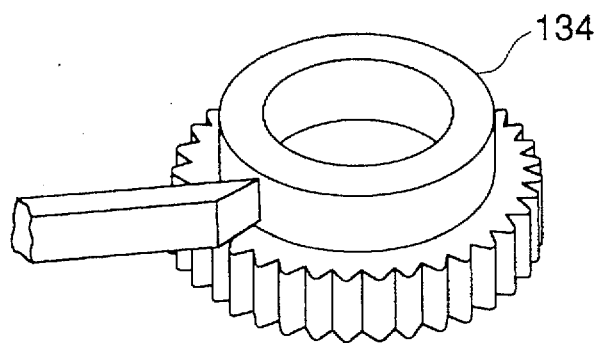
FIG. 18 is a perspective view wherein an variation of the 8th embodiment is viewed from the upper part.

FIGS. 16–18 represent the eighth embodiment. FIG. 16 is a top view of a film winding knob and others in the course of film winding in this embodiment, and FIG. 17 is a perspective view wherein the present embodiment is viewed from the top.

On film winding knob 121, circular elastic member 124 which is concentric with the film winding knob 121 is formed to be united integrally, and when the film winding knob 121 is rotated for film winding, the elastic member 124 also rotates. In addition, reversion-preventing claw 122 whose tip is formed to make an acute angle is provided, and the tip 122a of the reversion-preventing claw 122 is brought into pressure contact with side portion 124a of the elastic member 124. Fixed portion 122b of the reversion-preventing claw 122 is positioned on the upstream side in the film winding direction A of the film winding knob 121 from the straight line obtained by connecting rotational center 121a of the film winding knob 121 with the tip 122a of the reversion-preventing claw 122 and by extending it, namely positioned at area B.

When rotating the film winding knob 121 in the film winding direction A under the aforesaid constitution, the film winding knob 121 can be rotated smoothly because tip 122a of the reversion-preventing claw 122 is operated to retract from the side potion 124a of the elastic member 124. In addition, noise generated in the course of film winding is extremely small because the reversion-preventing claw does not vibrate. In this case, when trying to rotate the film winding knob 121 in the direction opposite to the film winding direction A, the tip 122a of the reversion-preventing claw 122 catches the side portion 124a of the elastic member 124 by deforming it elastically, and therefore, the film winding knob 121 can not be rotated reversely. Therefore, the film winding knob 121 can be rotated only in one direction.

Incidentally, as a material of the elastic member 124, rubber is optimum, and acrylonitrile-butadiene rubber, natural rubber and ethylenepropylene rubber are preferable.

Incidentally, as an elastic member, ring-shaped elastic member 134 as shown in a perspective view of FIG. 18 may also be used.

The reversion-preventing claw 122 may also be brought into pressure contact with top surface portion 124b of the elastic member 124, without being brought into pressure contact with side portion 124a of the elastic member 124.

Ninth Embodiment

Figure 19:
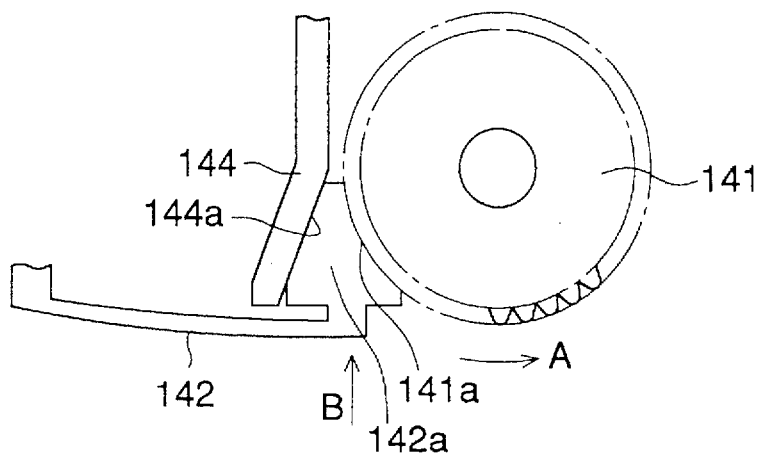
FIG. 19 is a top view wherein a film winding knob is not rotated in the 9th embodiment.

FIG. 19 shows the ninth embodiment. FIG. 19 is a top view wherein a film winding knob in the present embodiment is not rotated.

In the vicinity of film winding knob 141, there is provided a camera main body or wall portion 144 of a member affixed on a camera main body, and a V-shaped space whose width is diminished in the direction opposite to rotational direction A of film winding knob 141 is formed by side wall 141a of the film winding knob 141 and side wall 144a of the wall portion 144. Into this space, there is pressed in the direction B tip portion 142a that is formed to be wedge-shaped on the reversion-preventing member 142.

When the film winding knob 141 is rotated in the film winding direction A under the constitution mentioned above, rotational force of the film winding knob 141 causes the tip portion 142a to retract in the direction opposite to the direction B, and the film winding knob 141 can be rotated without any problem, accordingly. In addition, noise generated in the course of film winding is extremely small because the reversion-preventing member does not vibrate. In this case, when trying to rotate the film winding knob 141 in the direction opposite to the film winding direction A, reverse rotational force of the film winding knob 141 urges the tip portion 142a in the direction B, and the tip portion 142a of the reversion-preventing member 142 is inserted as a wedge into the space between side wall 141a of the film winding knob 141 and side wall 144a of wall portion 144. Therefore, reverse rotation of the film winding knob 141 is blocked. Accordingly, the film winding knob 141 can rotate only in one direction.

Tenth Embodiment

Figure 20:
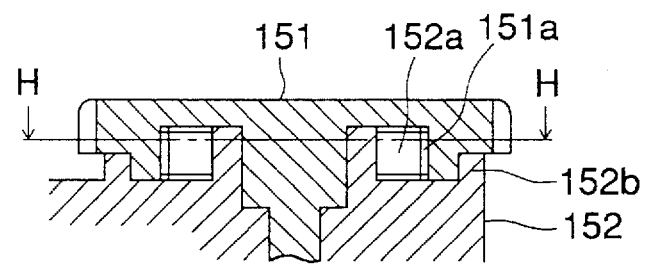
FIGS. 20(A) and 20(B) represent a film winding knob and others in the 10th embodiment.
Figure 20:
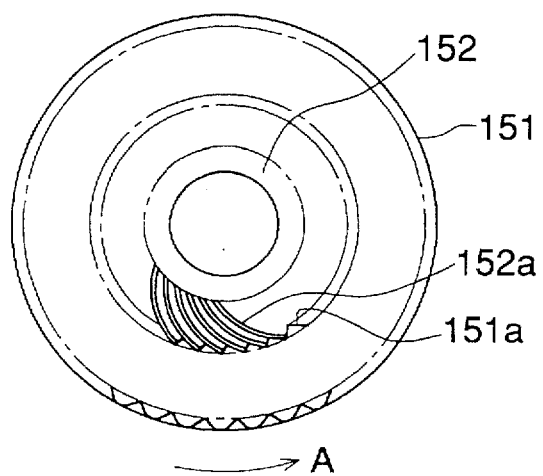

FIG. 20 shows the tenth embodiment. FIG. 20 represents diagrams of a film winding knob and others in the present embodiment, and FIG. 20(A) is a longitudinal section, while FIG. 20(B) is a sectional view taken on line H—H.

Film winding knob 151 is engaged with camera main body 152, and plural serrations 151a are formed on an inner circumferential surface of the film winding knob 151. On the wall portion of the camera main body 152 positioned inside the plural serrations 151a, there are provided a plurality of reversion-preventing claws 152a which are engaged with the plural serrations 151a.

Therefore, when rotating the film winding knob 151 in the film winding direction A, nothing blocks the film winding, and when rotating the film winding knob 151 reversely, plural reversion-preventing claws 152a engage with plural serrations 151a to block them to make the reverse rotation impossible, which is easily understood from FIG. 20(A).

In this case, the reversion-preventing claws 152a are different from a conventional piece of reversion-preventing claw 25 shown in FIG. 3. Since of large member of pieces are provided, its total size and thickness are small. Therefore, the noise quality is changed not to be conventional vibrational noise which is offensive to the ear.

With regard to the portion where the noise is generated, conventional reversion-preventing claw 25 used to be provided outside the film winding knob 18 and therefore, vibrational noise was heard directly. In the present embodiment, however, reversion-preventing claws 152a are provided inside the film winding knob 151, and therefore, the noise leaks to the outside is small. In addition, when blocking wall 152b is provided on the camera main body 152, the noise leaks to the outside is further reduced.

Incidentally, it is also possible that plural serrations are provided on the camera main body and plural reversion-preventing claws are provided on the film winding knob, which is opposite to the embodiment mentioned above.

Further, it is also possible that plural serrations and plural reversion-preventing claws are provided in the direction that is in parallel with a rotational shaft of the film winding knob, instead of the circumferential direction.

It is naturally possible that a member on which plural serrations or plural reversion-preventing claws are provided is a member fixed on the camera main body, instead of the camera main body itself.

Eleventh Embodiment

The eleventh embodiment will be explained as follows, referring to FIGS. 21–24.

Figure 21:
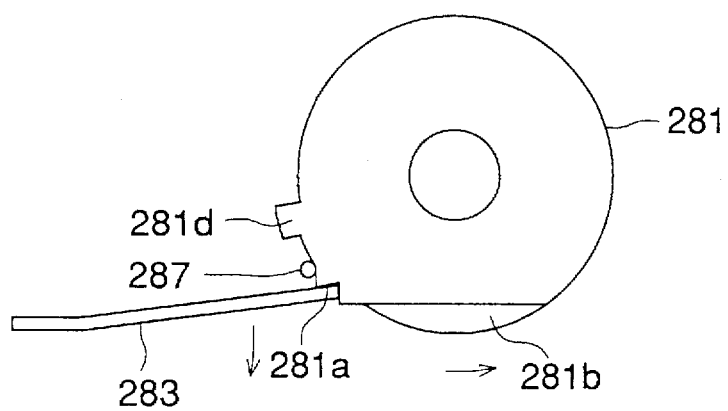
FIG. 21 is a top view of a releasing plate in the 11th embodiment.
Figure 22:
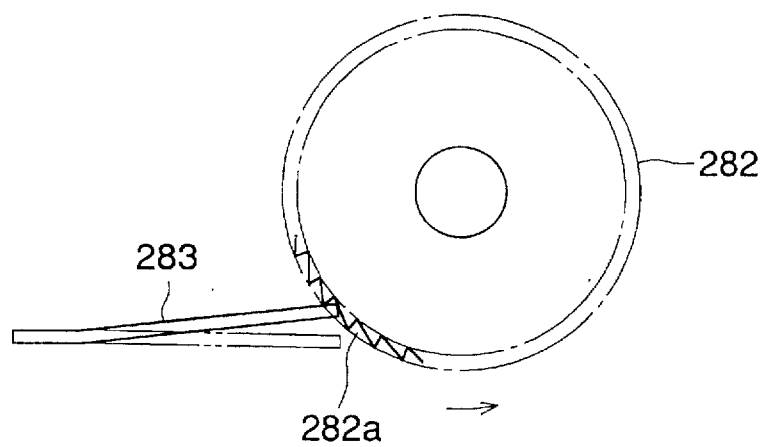
FIG. 22 is a top view of a film winding knob in the 11th embodiment.
Figure 23:
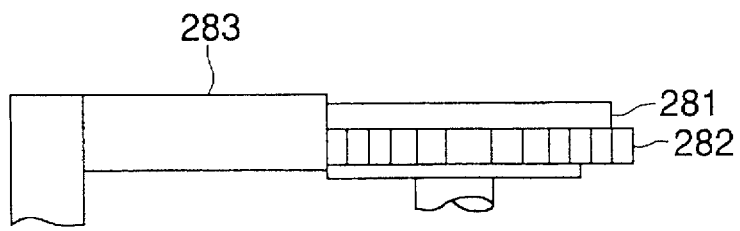
FIG. 23 is a side view of a reversion-preventing claw which engages with a releasing plate and a film winding knob in the 11th embodiment.
Figure 24:
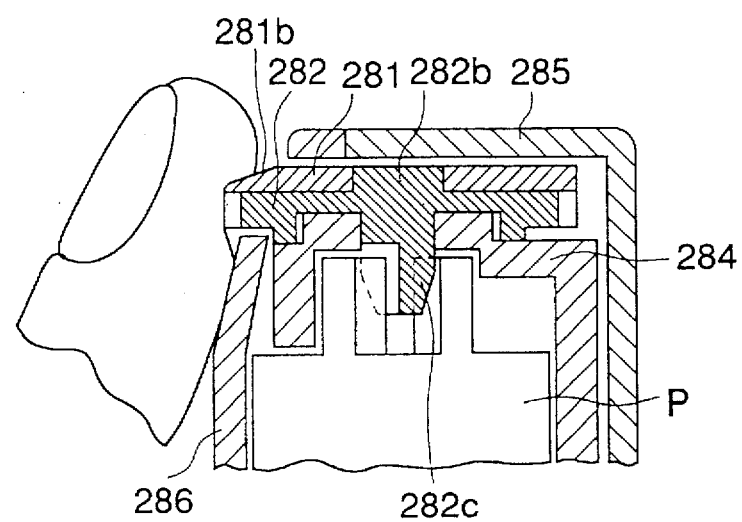
FIG. 24 is a longitudinal section of a camera wherein a releasing plate and a film winding knob are incorporated in the 11th embodiment.

FIG. 21 is a top view of a releasing plate, FIG. 22 is a top view of a film winding knob, FIG. 23 is a side view of a reversion-preventing claw that engages with the releasing plate and the film winding knob, and FIG. 24 is a longitudinal section of a camera in which the releasing plate and the film winding knob are incorporated.

As illustrated in FIGS. 21–23, reversion-preventing claw 283 is engaged with engaging portion 81a of the releasing plate 281 and with sawtooth-shaped claw 282a of the film winding knob 282. When the reversion-preventing claw 283 is engaged with claw 282a, the film winding knob 282 rotates only in the arrowed direction, and it can not rotate in the direction opposite to the arrowed direction.

As shown in a sectional view of FIG. 24, releasing plate 281 is engaged rotatably with upper shaft 282b of the film winding knob 282, and the lower shaft 282c of the film winding knob 282 is engaged with the camera main body 284 and also is engaged with film cartridge P at the tip of the lower shaft 282c. Incidentally, the numeral 285 is a front cover and 286 is a rear cover.

Under the constitution mentioned above, a palm of a finger is brought into pressure contact with the film winding knob 282 to rotate it so that a film is wound up into film cartridge P. In the course of this film winding operation, a palm of a finger is in pressure contact with claw 282a of the film winding knob 282 and also with slope portion 281b of the releasing plate 281 to rotate also the releasing plate 281 with friction of the finger. However, the releasing plate 281 rotates to cover only a small angle, until projection 281d of the releasing plate 281 hits stopper 287. Due to this rotation of the releasing plate 281, engaging portion 281a pushes the tip of reversion-preventing claw 283 in the arrowed direction so that the reversion-preventing claw 283 is retracted from claw 282a of the film winding knob 282 as shown in FIG. 22. Therefore, the reversion-preventing claw 283 is always in its retracted position in the course of film winding, and the reversion-preventing claw 83 does not generate vibrational noise.

Twelfth Embodiment

The twelfth embodiment will be explained as follows, referring to FIGS. 25–30.

Figure 25:
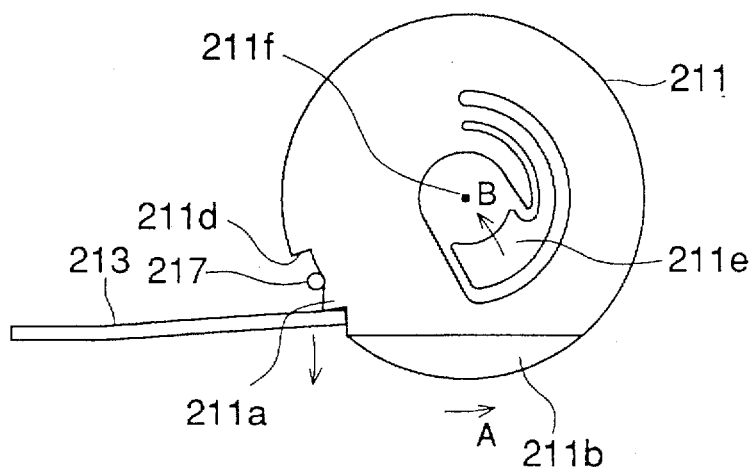
FIG. 25 is a longitudinal section of a releasing plate and a film winding knob in the 11th embodiment.
Figure 26:
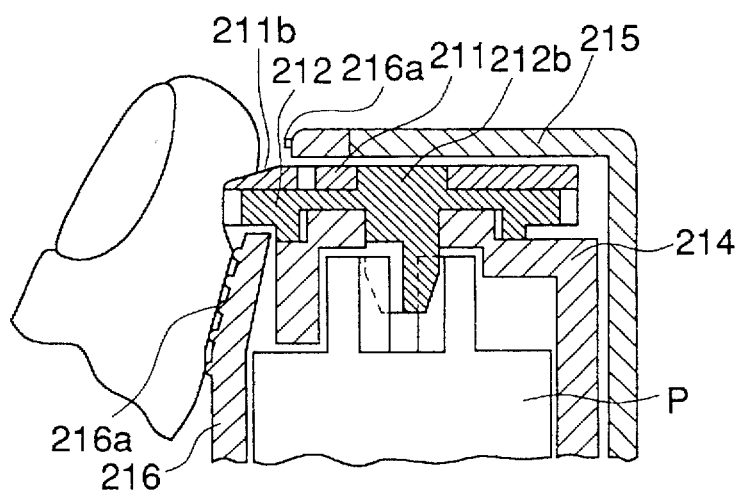
FIG. 26 is a top view of a releasing plate in the 12th embodiment.

FIG. 25 is a top view of a releasing plate, and FIG. 26 is a longitudinal section of a camera wherein the releasing plate and a film winding knob are incorporated.

In the drawing, the numeral 211 represents a releasing plate which is a releasing member, 212 represents a film winding knob, 213 is a reversion-preventing claw, 214 is a camera main body, 215 is a front cover, 216 is a rear cover, and P is a film cartridge, and basic constitution is similar to that explained in FIGS. 21–24 as the conventional technology. Therefore, when winding up a film into the film cartridge, film winding knob 212 is rotated by a palm of a finger, and releasing plate 211 also is rotated by a prescribed angle until stopping portion 211d hits stopper 217, thus, reversion-preventing claw 213 is retracted in the arrowed direction by engaging portion 211a that rotates counterclockwise and the reversion-preventing claw 213 is disengaged from the film winding knob 212.

However, the different point between the twelfth embodiment and the eleventh one is that an outside diameter of releasing plate 211 at the point where a finger of a photographer comes in pressure contact in the twelfth embodiment is mostly the same as or slightly larger than that of film winding knob 212.

Further, inside the releasing plate 211, there is formed solidly spring member 211e having a circular-arc-shaped arm portion that is an urging member, and it is in pressure contact with upper shaft 212b of the film winding knob 212 along roughly a circular arc whose center is engaging portion 211a and its radius corresponds to a length between the engaging portion 211a and rotational center 211f of the releasing plate 211.

Incidentally, since the releasing plate 211 is a resin-molded part, spring member 211e is a resin spring.

It is also possible that the spring member 211e is formed to be a member independent from the releasing plate 211 and it is fixed on the releasing plate 211 by means of screws or welding.

Therefore, when winding up a film, the film winding knob 212 is rotated and the releasing plate 211 also is rotated until stopping portion 211d hits stopper 217, and in this case, slope portion 211b is pressed by a palm of a finger against urging force of spring member 211e and the releasing plate 211 is pushed in. Thereupon, reaction force of pressure contact with upper shaft 211b made by rotational force A in the film winding direction and spring member 211e makes the engaging portion 211a to rotate stably counterclockwise to release the reversion-preventing claw 213 more surely.

Incidentally, when a finger is released, the releasing plate 211 returns to its original position due to urging force of the spring member 211e.

In the conventional way, a rear cover surrounding a film winding knob used to be retracted as far as possible so that a finger operating the film winding knob does not touch the rear cover. However, this has been made difficult by downsizing of a camera. However, when a finger touches a rear cover or other fixed members directly, friction force is great and feeling in film winding is adversely affected, which has been a problem. As remedies for this, a plurality of ribs 216a which are in parallel with the film winding direction are provided on the rear cover. Due to this, a contact area between a finger and the rear cover is reduced, and thereby friction force is lowered and feeling of film winding is improved.

Owing to the constitution mentioned above, it is difficult to rotate only film winding knob 212 with the tip of a finger or of a nail, and pressed releasing plate 211 also is rotated without fail. Therefore, reversion-preventing claw 213 can be released surely and therefore, vibrational noise by the reversion-preventing claw 213 is not generated at all. In addition, since the releasing plate 211 is pressed by a finger tip and is moved, feeling in film winding is not worsened.

Figure 27:
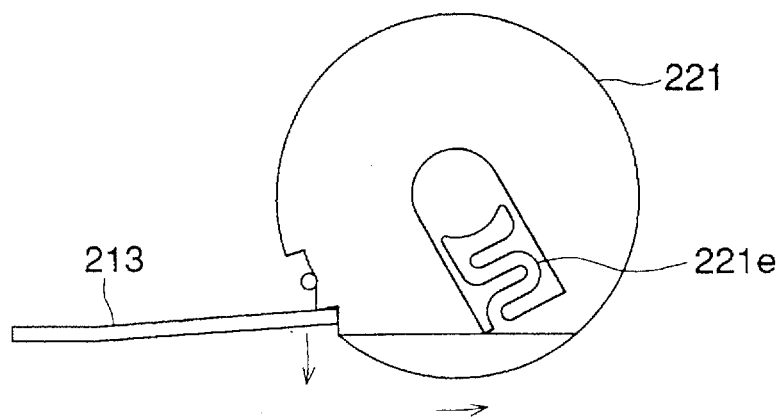
FIG. 27 is a longitudinal section of a camera wherein a releasing plate and a film winding knob are incorporated in the 12th embodiment of the invention.

FIG. 27 is a diagram of a releasing plate wherein a shape of a spring member is different from that in the foregoing, and inside releasing plate 221, there is provided zigzag spring member 221e.

Figure 28:
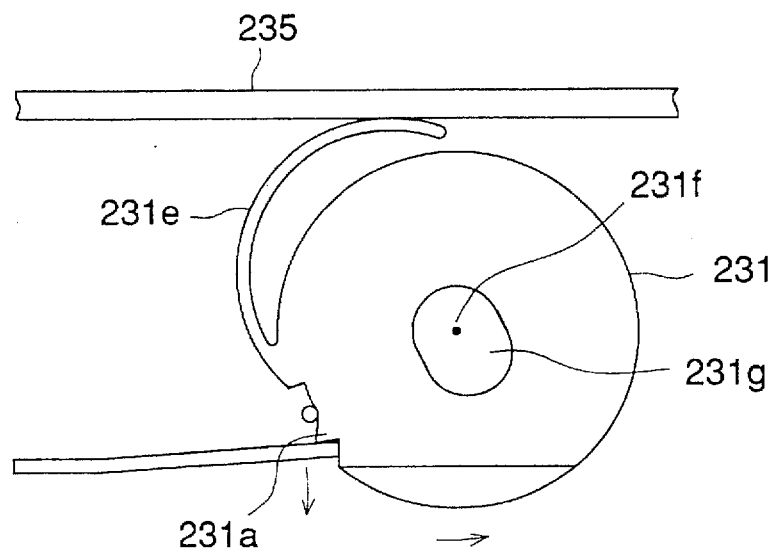
FIG. 28 is a diagram of a releasing plate whose spring member is different from that in FIG. 27.

FIG. 28 is a diagram wherein a spring member is provided on an outer circumferential surface of a releasing plate, and a circular arc-shaped spring member 231e provided on releasing plate 231 is in pressure contact with front cover 235. Further, hole 231g on releasing plate 231 engaging with an upper shaft of a film winding knob is formed to be an elongated hole running along roughly a circular arc whose center is engaging portion 231a and its radius corresponds to a length between the engaging portion 231a and rotational center 231f of the releasing plate 231.

Incidentally, the spring member 231e may also be brought into pressure contact with a camera main body.

Figure 29:
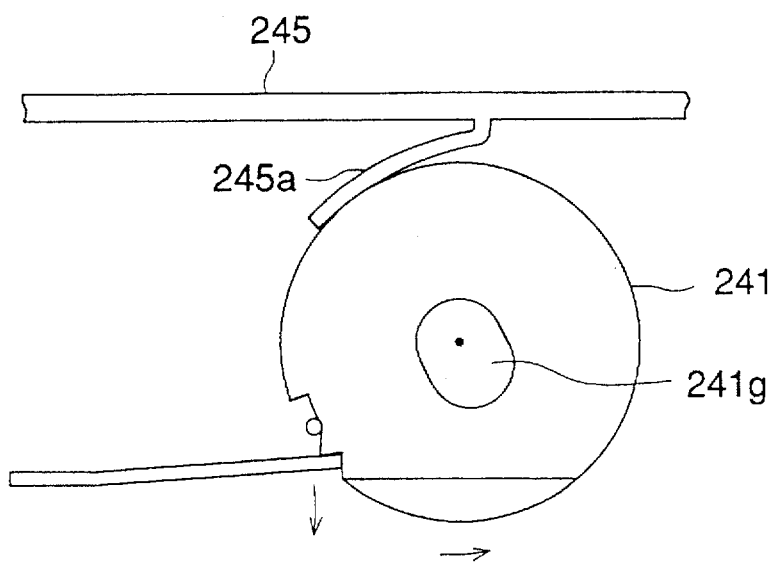
FIG. 29 is a diagram of the 12th embodiment wherein the spring member is provided on the outer surface of the releasing plate.

FIG. 29 is a diagram wherein a spring member is provided not on the releasing plate but on the front cover, and spring member 245a provided solidly with front cover 245 is in pressure contact with a side wall of releasing plate 241. Hole 241g is an elongated hole formed similarly to the hole 231g mentioned above.

Incidentally, the spring member 245a may also be provided on the camera main body.

Figure 30:
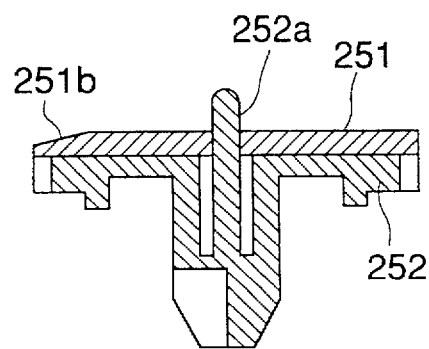
FIG. 30 is a diagram of the 12th embodiment wherein the spring member is provided on the front cover.

FIG. 30 is a sectional view of a releasing plate and a film winding knob, and releasing plate 251 is engaged with center shaft 252a that is a bar-shaped spring member of film winding knob 252. Accordingly, when slanting surface 251b of the releasing plate 251 is pressed, the releasing plate 251 is moved in the arrowed direction against urging force of the center shaft 252a.

Thirteenth Embodiment

Figure 31:
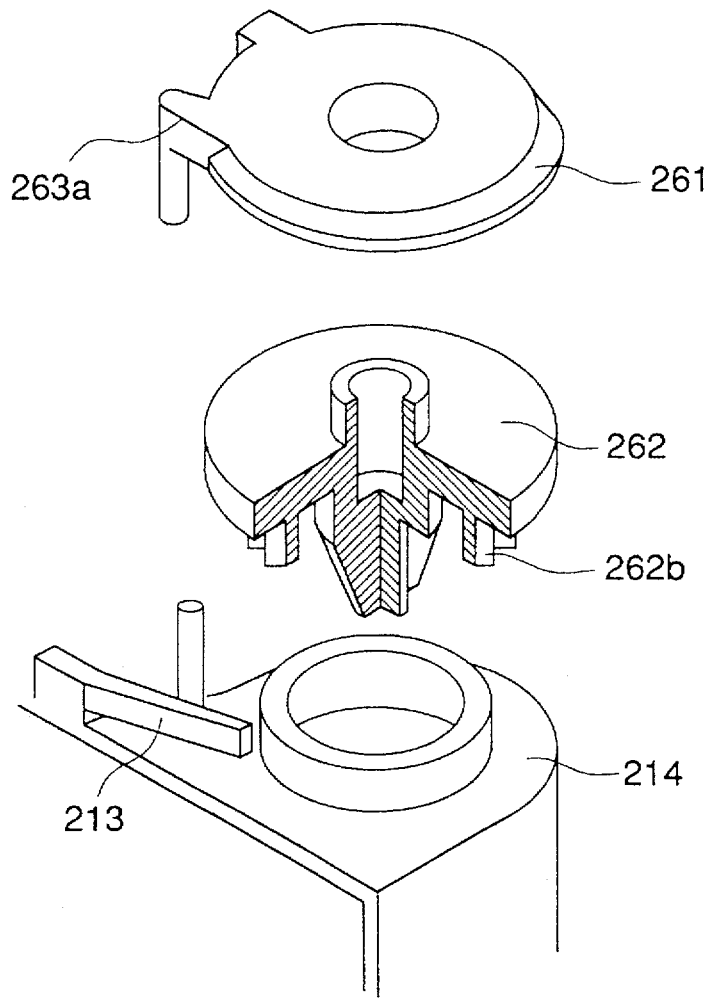
FIG. 31 is a perspective view showing primary parts in the 13th embodiment.
Figure 32:
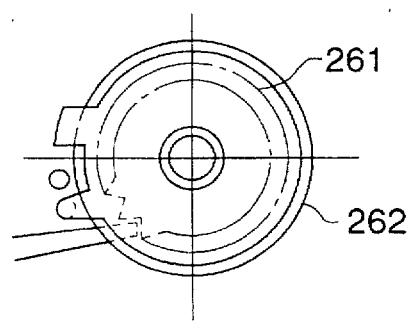
FIG. 32 is a top view of a film winding knob and others before film winding in the 13th embodiment.

The thirteenth embodiment will be explained as follows, referring to FIGS. 31 and 32. FIG. 31 is a perspective view showing primary parts in the present embodiment, and FIG. 32 is a top view of a film winding knob and others before film winding.

The relation between film winding knob 262 and reversion-preventing claw 213 in the present embodiment is the same as that in the second embodiment. It is also the same that releasing member 261 having arm portion 263a is engaged with film winding knob 262 in a sliding manner. In the present embodiment, however, a releasing member is formed to be united with saw teeth 262b (ratchet gear) which is smaller than film winding knob 262 in terms of diameter.

Fourteenth Embodiment

Figure 33:
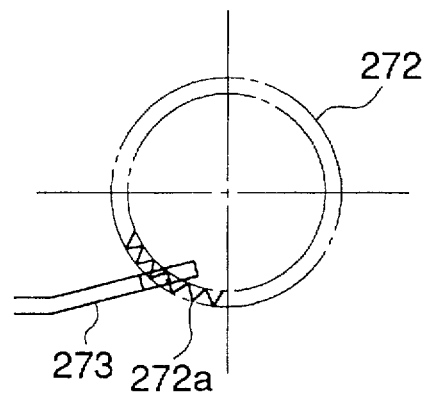
FIG. 33 is a top view of a film winding knob and a reversion-preventing claw in the 14th embodiment.
Figure 34:
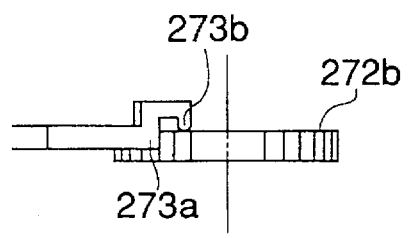
FIG. 34 is side view of a film winding knob and a reversion-preventing claw in the 14th embodiment.

The fourteenth embodiment will be explained as follows, referring to FIGS. 33 and 34. FIG. 33 is a top view of a film winding knob and a reversion-preventing claw, and FIG. 34 is a side view of the film winding knob and the reversion-preventing claw.

In the present embodiment, a tip portion of reversion-preventing claw is divided into connecting portion 273a that connects with saw teeth 272a of film winding knob 272 and touching portion 273b that is always in contact with upper surface 272b of the film winding knob. Accordingly, vibration generated from a connection portion of the saw teeth 272a and the connecting portion 273a when the film winding knob is rotated is reduced by the contact between the upper surface 272b of the film winding knob and the touching portion 273b, thus, vibration can be controlled since the vibration is transmitted to the film winding knob.

In the present invention, it is possible to eliminate occurrence of vibrational noises by retracting a reversion-preventing claw in the course of film winding, it is possible to absorb vibrational noises by a finger of an operator, or, it is possible to inhibit vibrational noises by providing plural reversion-preventing claws or by causing a reversion-preventing claw to be in contact constantly with a part of a film winding knob. In the invention, it is possible to achieve the maximum value of 60 dB or less for a noise level in film winding noise caused by a film winding knob at the point being away from the front side of a single-use camera by 15 cm.

What is claimed is:

1. A camera, comprising:
   a film winding member, capable of rotating in a predetermined direction, for winding a film;
   a reversion-preventing member, having an engagement with said film winding member, for preventing said film winding member from rotating in a direction other than said predetermined direction;
   a releasing means for moving said reversion-preventing member so as to release said reversion-preventing member from said engagement with said film winding member when said film is wound by said film winding member in said predetermined direction.

2. The camera of claim 1, wherein said film winding member includes a film winding knob for performing a winding operation of said film winding member, and said reversion-preventing member is engaged with said film winding knob.

3. The camera of claim 1, wherein said film winding member includes:
   a film winding knob for performing a winding operation of said film winding member; and
   an engaging member for engaging said film winding member with said reversion-preventing member.

4. The camera of claim 1, wherein said releasing means includes an arm portion for releasing said engagement of said reversion-preventing member with said film winding member wherein said arm portion rotates integrally with said film winding member by a friction between said arm portion and said film winding member.

5. The camera of claim 4, further comprising:
   a restricting member for restricting a rotation of said arm portion, caused by said friction, to a predetermined range.

6. The camera of claim 1, wherein said releasing means includes an arm portion for releasing said engagement of said reversion-preventing member with said film winding member wherein said releasing means is capable of being rotated by an operator.

7. The camera of claim 6, wherein said releasing means and said film winding member are rotatably disposed on a same axis.

8. The camera of claim 6, further comprising:
   a restricting member for restricting a rotation of said arm portion, caused by said friction, to a predetermined range.

9. The camera of claim 1, wherein said releasing means includes an arm portion for releasing said engagement of said reversion-preventing member with said film winding member when said releasing means is pressed by an operator.

10. The camera of claim 9, further comprising:
    an urging member for urging said releasing means to a position where said releasing means is positioned when said releasing means is not pressed by said operator.

11. The camera of claim 9 wherein said reversion-preventing member has an elasticity and urges said releasing means toward a position where said releasing means is positioned when said releasing means is not pressed by said operator.

12. The camera of claim 10, wherein said urging member is an elastic member which is unitedly formed with said releasing means.

13. The camera of claim 1, wherein said releasing means includes a cam member, being engaged with said reversion-preventing member, for releasing said engagement of said reversion-preventing member with said film winding member when said film is wound by said film winding member wherein said film winding member is synchronized with a movement of said cam member.

14. The camera of claim 13, wherein said cam member is rotated one turn when said film is wound for one picture frame.

15. A camera, comprising:

a film winding member, capable of rotating in a predetermined direction, for winding a film;

a reversion-preventing member, having an engagement with said film winding member, for preventing said film winding member from rotating in a direction other than said predetermined direction;

a releasing means for releasing said engagement of said reversion-preventing member with said film winding member when said film is wound by said film winding member, said releasing means being a holding member for movably holding said film winding member, and said releasing means releases said engagement of said film winding member from said reversion-preventing member by allowing said film winding member moved apart from said reversion-preventing member when said film winding member is pressed by an operator.

16. The camera of claim 15, further comprising:

an urging member for urging said film winding member to a position where said film winding member is positioned when said film winding member is not pressed by said operator.

17. The camera of claim 16, wherein said urging member is a release button for releasing a shutter of said camera.

18. The camera of claim 16, wherein said urging means is an elastic member disposed to a main body of said camera.

* * * * *